TAPE DRIVE ARRANGEMENT

Filed Dec. 16, 1966

Inventor:-
Robert J. Hammond,
By Brown, Jackson, Boettcher & Dienner
Attys.

United States Patent Office 3,402,868
Patented Sept. 24, 1968

3,402,868
TAPE DRIVE ARRANGEMENT
Robert J. Hammond, Stevensville, Mich., assignor to V-M Corporation, Benton Harbor, Mich., a corporation of Michigan
Filed Dec. 16, 1966, Ser. No. 602,314
11 Claims. (Cl. 226—187)

The present invention relates generally to a tape drive arrangement for use with flexible strip tapes and the like, and more particularly, to a novel tape drive arrangement utilizing hard and soft surfaced pressure rollers to engage the tape against a drive capstan and thereby effect better control over the linear tape speed.

It is a common practice in the tape recorder art, such as in magnetic tape recorders, to utilize a drive capstan to facilitate movement of a flexible tape between a tape supply reel and a tape take-up reel with a transducer head being disposed between the tape supply reel and the drive capstan to engage the tape for recording and reproducing intelligence on and from the tape. It is also a common practice to provide a pressure roller which is adapted to engage the tape against the drive capstan to facilitate the proper driving relation of the tape on the drive capstan. The pressure roller is normally wider than the tape and includes a relatively compliant peripheral surface which engages the tape against the drive capstan.

The prior art tape drive arrangements which utilize pressure rollers having compliant peripheral surfaces to engage the tape against the drive capstan have been found to exhibit drawbacks which contribute to non-linear tape speed and thereby produce wow and undesirable audible noises during playback. This is largely due to the fact that the edge portions of the compliant peripheral engaging surface of the pressure roller overlap the tape and engage the peripheral drive surface of the capstan such that the capstan directly drives the pressure roller. The portion of the pressure roller peripheral surface that engages the tape then serves to drive the tape due to the difference in the coefficients of friction between the hard drive surface of the capstan and the compliant surface of the pressure roller. In effect, the tape is compliantly coupled to the capstan through the pressure roller. Any change in the compliance due to variations in the compliant material of the pressure roller, the area of contact of the pressure roller peripheral surface against the capstan, or the contact pressure, will result in corresponding variations in the tape velocity, thereby contributing to a non-linear tape speed.

It has been found that by using a pressure roller having a non-compliant peripheral surface to engage the tape against the drive capstan, many of the above described disadvantages are overcome and a nearly perfect linear tape drive is obtained. However, in using a pressure roller having a non-compliant roller surface, the tape is pressed between two hard cylindrical surfaces and the contact pressure must be limited to prevent crushing of the tape. As a result, the drive force available with a tape drive arrangement using a capstan and a pressure roller having non-compliant peripheral drive surfaces is normally inadequate for effecting the desired tape speed.

It is therefore a primary object of the present invention to provide a tape drive arrangement which overcomes the above described disadvantages in the prior art by utilizing a pair of pressure rollers having respectively, non-compliant and compliant peripheral surfaces to engage the tape against the drive capstan in driving relation therewith.

Another object of the present invention is to provide a tape drive arrangement utilizing a drive capstan operatively associated with a pressure roller having a non-compliant surface and a pressure roller having a compliant surface such that a tape passed over the capstan is first passed between the capstan and the non-compliant pressure roller which provides a portion of the required driving force, and then is passed between the capstan and the pressure roller having a compliant peripheral surface which provides the balance of the driving force required to effect the desired tape speed.

A further object of the present invention is to provide a tape drive arrangement as described including a mounting support for the pressure rollers, which mounting support is pivotally mounted to allow the pressure rollers to be brought into engagement with the tape against the drive capstan and removed from the drive capstan to thereby allow the tape to be readily removed from the drive capstan.

Yet another object of the present invention is to provide a tape drive arrangement as described including means for urging the pressure rollers against the drive capstan to insure the proper drive force necessary to obtain the desired tape speed.

A further object of the present invention is to provide a tape transport arrangement as described wherein the resultant force vector on the drive capstan from the forces of the pressure rollers lies in a plane substantially parallel to the plane of the tape as the tape approaches and initially engages the drive capstan.

In a preferred embodiment of my invention, I provide a drive capstan mounted for driven rotational movement about its center axis in a conventional manner and having a peripheral drive surface thereon adapted to engage a tape in driving relation. A pressure roller support bracket is rotatably mounted about an axis parallel to the axis of the drive capstan for rotational movement toward and away from the drive capstan. The support bracket includes elongated slots therein to receive the end portions of shafts having pressure rollers rotatably mounted thereon. The pressure rollers and their center shafts are movable within the elongated apertures to engage the tape against the drive capstan. Spring means are provided on the support bracket to urge the pressure rollers against the drive capstan when the support bracket is moved to a position such that the pressure rollers engage the tape against the drive capstan. The pressure rollers are positioned such that when the tape is passed over the peripheral surface of the drive capstan, it will first pass between the capstan and a pressure roller having a non-compliant peripheral tape engaging surface. The tape is then passed further around the peripheral surface of the drive capstan and between the capstan and the second pressure roller which is provided with a compliant peripheral tape engaging surface. The pressure roller support bracket and the spring means are such that the resultant force on the drive capstan from the engaging forces of the pressure rollers will have a vector direction generally parallel to the plane of tape as it approaches and initially engages the drive capstan.

Other objects, features and advantages of the present invention will become apparent from the following description of a preferred embodiment of the invention when taken in conjunction with the accompanying drawing in which like reference numerals designate like parts throughout the several views and wherein.

Figure 1:
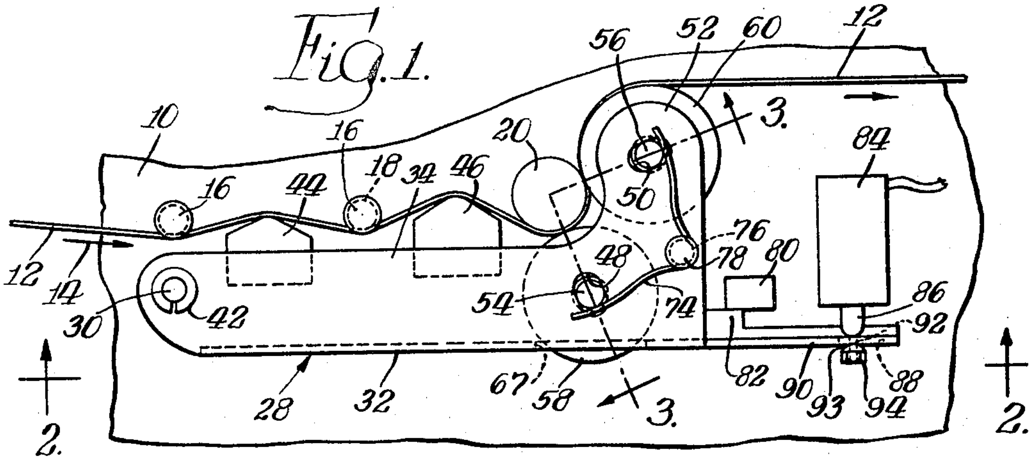
FIGURE 1 is a top plan view of a tape drive arrangement in accordance with the present invention.
Figure 2:
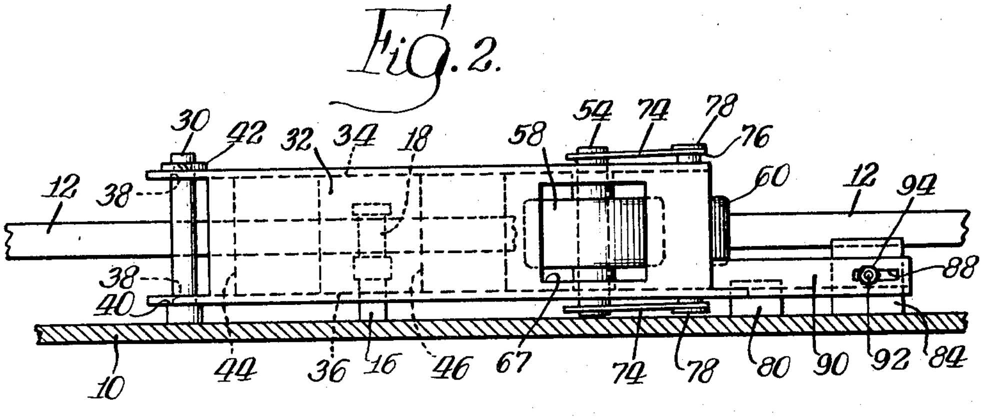
FIGURE 2 is an elevational view of the tape drive arrangement illustrated in FIGURE 1 taken substantially along the line 2—2 of FIGURE 1.

Referring now to FIGURE 1, a tape drive arrangement constructed in accordance with the present invention is illustrated having the various components and elements thereof supported on a base plate 10. The base plate 10 may form the base or support plate for a conventional magnetic tape recorder of the type utilizing tape supply and take-up reels (not shown) rotatably mounted on the base plate in a conventional manner. The supply and take-up reels are adapted to support a continuous tape 12, such as a flexible magnetic tape as is conventionally used in magnetic tape recorders for transfer therebetween. As the tape is unwound from the supply reel in a direction as shown by arrow 14, it engages a pair of guide pins 16 which include annular grooves 18 having axial lengths slightly greater than the width of the tape 12 so as to receive the tape and maintain it in a relative fixed position above the base plate 10 during transportation thereof from the supply reel to the take-up reel. The guide pins 16 may be made of a polished steel so that they will not damage the tape 12 and are supported on the support plate 10 in a conventional manner.

A drive capstan 20 having a depending shaft portion 22 is rotatably mounted relative to the base plate 10 through a bearing member 24 which is affixed to the base plate by meains of a snap ring 26. The capstan 20 is disposed perpendicular to the support plate 10 and is adapted to be rotatably driven in a conventional manner. The capstan serves to effect movement of the tape 12 between the supply reel and the take-up reel as will be described more fully hereinbelow. The surface of the capstan 20 is a non-compliant surface.

A support frame or bracket, shown generally by reference numeral 28, is rotatably mounted about a vertically disposed support pin 30 which may be fixedly secured to the base plate 10 in any suitable manner. The support bracket 28 includes a back plate portion 32 and upper and lower plate portions, or flanges, 34 and 36, respectively. The upper and lower plate portions 34 and 36 lie in generally parallel horizontal planes disposed in normal relation to the back plate 32 so as to form a generally C-shaped cross section. The upper and lower plate portions 34 and 36 have apertures 38 therein which receive the support pin 30 therethrough to allow the support bracket 28 to rotate about the pin 30. The lower plate portion 36 rests upon a shoulder 40 formed on the lower portion of the support pin 30. A snap ring 42 is provided on the upper end of the support pin adjacent the upper surface of the upper plate portion 34 to retain the support bracket 28 in relative fixed axial position on the support pin, while allowing free rotational movement of the support bracket about the support pin.

The support bracket 28 is adapted to support a pair of transducer heads 44 and 46 between the upper and lower plates 34 and 36. The transducer heads are positioned relative to the axis of rotation of the support bracket 28 such that when the support bracket is rotated toward the tape 12 the transducer head 44 will engage the tape intermediate the guide pins 16, while the transducer head 46 will engage the tape intermediate the rightmost guide pin 16 and the drive capstan 20. The transducer heads 44 and 46 are conventional in construction and serve to effect the recording of intelligence on the tape 12 and the reproduction of intelligence therefrom in a conventional manner. If desired, the transducer head 44 may comprise a conventional erase head while transducer head 46 may be utilized for both recording and reproducing intelligence on and from the tape.

Each of the upper and lower support bracket flanges 34 and 36 includes a pair of elongated apertures 48 and 50 provided in extending arm portions 52 of the respective upper and lower flanges. The major axes of the respective elongated apertures 48 and 50 lie in planes containing the axis of rotation of the drive capstan 20. The corresponding apertures 48 and 50 in the upper and lower plate portions 34 and 36 are in vertical alignment and receive the end portions of a pair of center pins 54 and 56, respectively. The center pins 54 and 56 rotatably support pressure rollers 58 and 60, respectively, as will be more fully described hereinbelow. The widths of the minor axes of the elongated apertures 48 and 50 are substantially the same as the outer diameters of the pins 54 and 56 so as to allow sliding movement of the pins 54 and 56 within their respective elongated apertures, while maintaining the center axes of the respective pins in the aforementioned planes containing the major axes of the elongated slots and the axis of rotation of the capstan 20. It will be understood that the respective elongated apertures 48 and 50 are positioned within the supporting bracket 28 such that the pressure rollers 58 and 60 are spaced sufficiently from each other to allow contact thereof against the drive capstan 20 without interfering with each other.

The pressure roller 58 comprises an annular member preferably made of a hard material such as a steel alloy so as to provide a pressure roller having a noncompliant outer peripheral surface 62. The pressure roller 58 has a central aperture 64 which receives a bearing bushing 66 made of any of the well known bronze bearing alloys. A pair of tubular spacer members 68 are disposed about the pin 54 and serve to center the pressure roller 58 between the upper and lower support plates 32 and 34 of the support bracket 28. An opening 67 is provided in the back plate 32 of the support bracket 28 to allow the pressure roller 58 to project therethrough for free rotation on pin 54.

The pressure roller 60 is preferably made of a compliant material such as rubber and has an annular configuration similar to the pressure roller 58. The pressure roller 60 is preferably formed with a steel sleeve insert 70 which receives a bronze bearing 66 therethrough. The bearing 66 in turn receives the pin member 56 for rotation thereon in similar fashion to the bronze bushing 66 of the pressure roller 58. A pair of tubular spacer members 68 are also disposed on the pin 56 to center the pressure roller 60 between the horizontal plate portions 32 and 34 of the support bracket 28, as above described with respect to the centering of the pressure roller 58. If desired, the pressure roller 60 may comprise an annular metallic member having the peripheral surface thereof provided with a compliant material such as rubber. The compliant surface should have a radial thickness greater than the thickness of the tape 12.

Each of the pins 54 and 56 has annular grooves 72 provided adjacent the upper and lower ends thereof. The annular grooves 72 serve to receive the end portions of a pair of springs 74 which are disposed above and below the horizontal plate portions 32 and 34 of the support bracket 28. The springs 74 resiliently urge the pressure rollers 58 and 60 against the peripheral surface of the drive capstan 20 when the mounting bracket 28 is rotated to a tape engaging position as described hereinbelow. The springs 74 are generally bow-shaped and have intermediate loop portions 76 which snugly snap onto projecting spring support pins 78 fixedly secured, respectively, to the outer surfaces of the upper and lower horizontal plate portions 32 and 34 of the support bracket 28.

As was described hereinabove, the support bracket 28 is rotatable about the support pin 30 to allow the transducer heads 44 and 46 and the pressure rollers 58 and 60 to be moved away from the tape 12 and the drive capstan 20. This allows the tape 12 to be readily placed in the annular grooves 18 of the guide pins 16 and around the capstan 20. To properly locate the pressure rollers 58 and 60 relative to the capstan 20 when the support bracket 28 is rotated toward the tape 12, a limiting stop means is provided comprising a stop member 80 which is suitably secured to the base plate 10. The support bracket 28 includes a projecting shoulder portion 82 which abuts the stop member 80 when the support bracket 28 has been rotated to a position wherein the pressure rollers engage the capstan 20 and the pins 54 and 56 are moved to positions central of the elongated apertures 48 and 50.

To facilitate the rotational movement of the support bracket 28, a solenoid 84 having a plunger rod 86 may be fixedly secured to the base plate 10 generally outwardly from the stop member 80. The plunger rod 86 is received within a horizontal slot 88 provided in an extending portion 90 of the support bracket 28. The outward end portion of the plunger rod 86 is preferably provided with a generally spherical portion which terminates in a threaded shank 92 having a nut 94 threadedly secured thereon to retain the arm portion 90 on the plunger rod 86 of the solenoid 84. The nut 94 is preferably provided with a semi-spherical surface portion 93 adjacent the slot 88 to prevent binding and to allow sliding movement of the plunger rod 86 within the slot 88 during outward rotation of the support bracket 28. The solenoid 84 may be suitably electrically coupled to a control circuit such that energizing the solenoid 84 will effect inward rotation of the support bracket 28 about the support pin 30 to cause engagement of the heads 44 and 46 with the tape and engagement of the rollers 58 and 60 with the capstan 20. De-energization of the solenoid permits movement of bracket 28 away from the driving engagement position as by a return spring (not shown) acting on the plunger of the solenoid or directly on the bracket 28.

Having thus described the elements comprising a preferred embodiment of a tape drive arrangement in accordance with the present invention, the operation thereof will be briefly described. When it is desired to place a tape on the tape drive or remove a tape therefrom, the solenoid 84 may be actuated to rotate the support bracket 28 outwardly from the drive capstan 20. After installing the tape on the guide pins 16 and around the drive capstan 20, the solenoid 84 may be actuated to rotate the support bracket 28 to a position wherein the shoulder portion 82 thereof engages the stop member 80. In this position, the transducer heads 44 and 46 will engage the tape 12 as above described and the pressure rollers 58 and 60 will engage the tape against the peripheral drive surface of the drive capstan 20.

Figure 3:
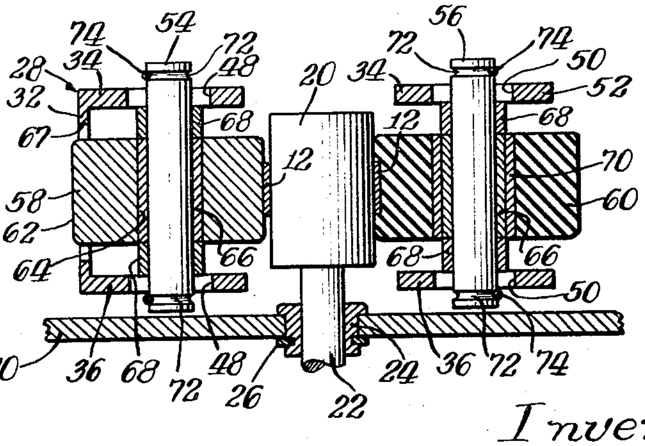
FIGURE 3 is a silghtly enlarged vertical sectional view taken substantially along the line 3—3 of FIGURE 1 and illustrates the pressure rollers and drive capstan in drive relation with the tape.

Referring to FIGURE 3, it will be seen that the non-compliant pressure roller 58 engages the tape 12 and presses it against the peripheral drive surface of the drive capstan 20, thus providing the drive capstan as the sole driving means for the tape at this point. The pressure roller 60 on the other hand, having a compliant peripheral surface, will also engage the tape 12 against the drive capstan 20, but the portion of the peripheral drive surface which overlaps the tape will, due to the compliancy thereof, directly engage the peripheral drive surface of the drive capstan 20. See FIGURE 3. This will cause the drive capstan 20 to actually drive the pressure roller 60 through engagement with the overlapping portions thereof against the drive capstan. Due to the differences in the co-efficients of friction of the peripheral drive surface of the drive capstan 20 and the compliant pressure roller 60, the portion of the pressure roller 60 which engages the tape will drive the tape 12 in a longitudinal direction, the pressure roller 60 in turn being driven by the drive capstan 20. Any variations in the composition of the compliant material comprising the pressure roller 60, or the area of contact of the peripheral surface of the pressure roller 60 against the drive capstan 20, or variations in the contact pressure between the pressure roller 60 and the capstan will result in corresponding variations in the velocity of travel of tape 12. The use of the non-compliant pressure roller 58 thus results in a more linear tape speed. However, as above noted, if the noncompliant pressure roller 58 is used as the sole pressure roller, the force with which the pressure roller must bear against the tape to obtain the proper drive relation of the tape against the capstan may damage the tape. By utilizing the second compliant pressure roller 60 in combination with pressure roller 58, the proper drive contact between the tape 12 and the drive capstan 20 can be obtained without damaging the tape 12. By placing the non-compliant pressure roller 58 such that it is the first roller to engage the tape, a more constant linear speed of the tape 12 over the transducer heads 44 and 46 is obtained and the above described disadvantages derived from the compliant pressure roller 60 when used alone, are eliminated. Preferably, the forces exerted upon the tape 12 against the drive capstan 20 by the respective pressure rollers 58 and 60 is such that the resultant force vector on the drive capstan 20 will be in a direction parallel to the plane of tape travel as it closely approaches and engages the capstan 20. An advantage to the arrangement is that if there is clearance between the shaft 22 of capstan 20 and the bearing for that shaft, the force parallel to the tape can hold the shaft against that side of the bearing which allows minimum change in the tape speed when there is shaft wobble in the bearing.

While a preferred embodiment of my invention has been shown and described, it will be obvious to those skilled in the art that changes and modifications may be made therein without departing from the invention in its broader aspects, and therefore, the appended claims are intended to cover all such changes and modifications as fall within the true spirit and scope of my invention. Where reference is made to vertical and horizontal positions, they are used by way of explanation and not as a limitation.

I claim:

1. A tape drive arrangement for use with a flexible tape and the like, comprising, in combination, a drive capstan supported for rotational movement about its center axis and adapted to engage the tape by a portion of its peripheral surface in driving relation, a first pressure roller having a non-compliant peripheral surface thereon adapted to engage the tape against said peripheral surface of said drive capstan, and a second pressure roller having a compliant peripheral surface thereon adapted to engage the tape against said peripheral surface of said drive capstan, said second pressure roller being disposed in circumferentially spaced relation about said drive casptan relative to said first pressure roller.

2. A tape drive arrangement as defined in claim 1 wherein said first pressure roller engages the tape against said drive capstan at a point in close proximity to the point at which the tape initially engages said drive capstan, and wherein said second pressure roller engages the tape against said drive capstan at a point circumferentially spaced about said drive capstan from said first pressure roller.

3. A tape drive arrangement as defined in claim 1 including a support frame adapted to support said pressure rollers for movement into engagement with the tape against said drive capstan and for movement away from said drive capstan.

4. A tape drive arrangement as defined in claim 3 including means operatively associated with said support frame for effecting movement of said support frame toward and away from the tape.

5. A tape drive arrangement as defined in claim 1 wherein each of said pressure rollers has a center pin extending outwardly from the ends of said rollers, and including a support frame having two sets of elongated apertures therein, each of said sets of elongated apertures being adapted to receive the ends of said center pins of said pressure rollers such that said pressure rollers may be movable within said slots for engagement with the tape against said peripheral surface of said drive capstan.

6. A tape drive arrangement as defined in claim 5 including means for resiliently urging said pressure rollers against said drive capstan.

7. A tape drive arrangement as defined in claim 5 wherein the major axes of each set of said elongated apertures lie in a plane containing the axis of rotation of said drive capstan such that the line of force of each of said pressure rollers against said drive capstan is generally normal to the peripheral surface of said drive capstan.

8. A tape drive arrangement as defined in claim 5 wherein the resultant force vector of the forces exerted by the two rollers against the capstan is in a direction generally parallel to the plane of the tape as the tape approaches and engages the capstan.

9. A tape drive arrangement as defined in claim 7 wherein said support frame is rotatably mounted about an axis parallel to the axis of rotation of said capstan whereby said pressure rollers may be moved into engagement with said tape against said drive capstan or removed therefrom upon rotational movement of said support frame.

10. A tape drive arrangement as defined in claim 9 including means to limit the rotational movement of said support frame in a direction wherein said pressure rollers engage the tape against said capstan.

11. A tape drive arrangement as defined in claim 6 wherein said means for urging said pressure rollers against said drive capstan comprise spring members mounted upon said support frame and adapted to engage the ends of said center pins to thereby resiliently urge said pressure rollers against said drive capstan.

References Cited

UNITED STATES PATENTS 3,093,284 6/1963 Mullins ____________ 226—176

M. HENSON WOOD, Jr., *Primary Examiner.*

J. P. MULLINS, *Assistant Examiner.*